Feb. 19, 1957  M. C. CAYET  2,782,291
THERMOSTATIC HEATING CONTROL SYSTEMS
Filed Jan. 14, 1954  2 Sheets-Sheet 1
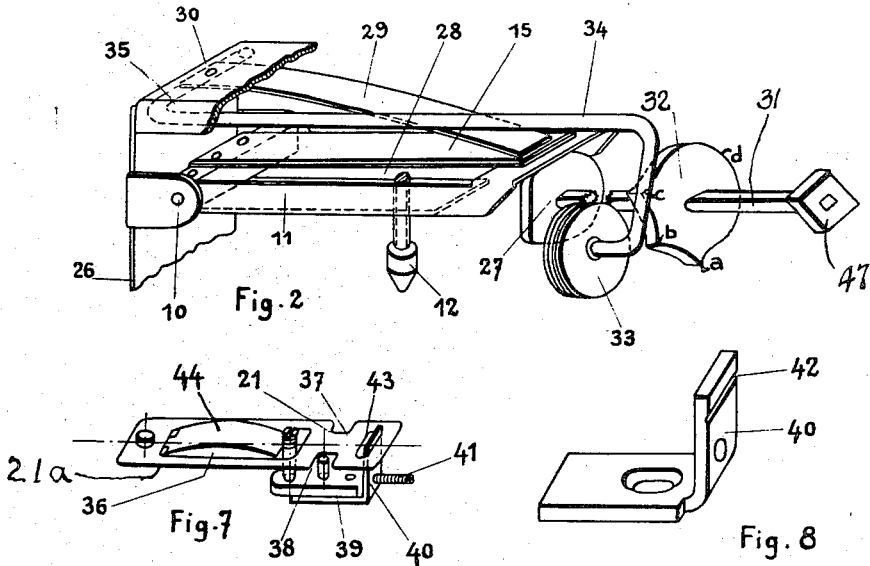
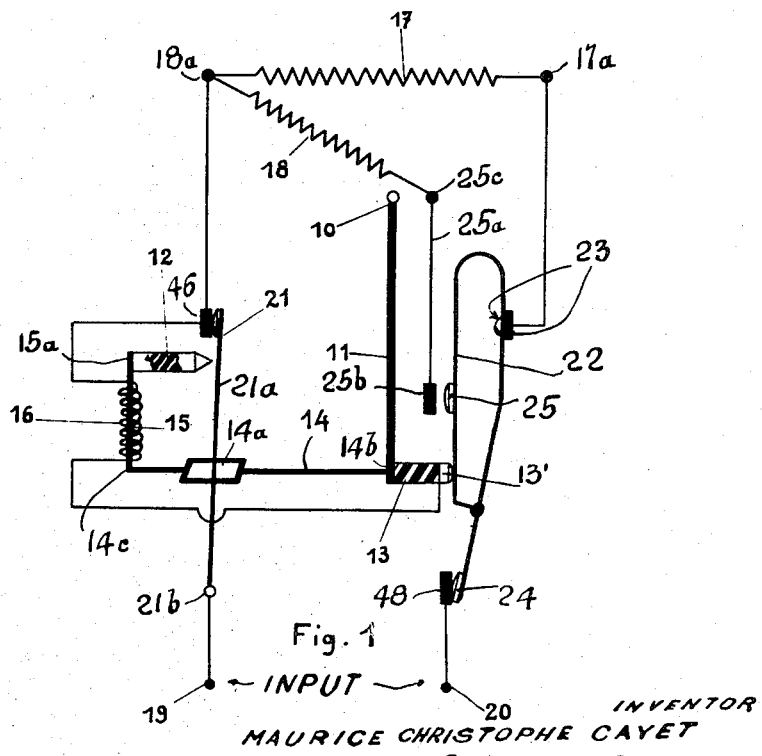
INVENTOR
MAURICE CHRISTOPHE CAYET
ATTORNEYS Feb. 19, 1957 M. C. CAYET 2,782,291
THERMOSTATIC HEATING CONTROL SYSTEMS
Filed Jan. 14, 1954 2 Sheets-Sheet 2

INVENTOR
MAURICE CHRISTOPHE CAYET,
ATTORNEYS

United States Patent Office 2,782,291
Patented Feb. 19, 1957

2,782,291

THERMOSTATIC HEATING CONTROL SYSTEMS

Maurice Christophe Cayet, Paris, France, assignor to Procedes Sauter, Paris, France, a corporation of France Application January 14, 1954, Serial No. 404,009

Claims priority, application France January 19, 1953

9 Claims. (Cl. 219—20)

The present invention relates to systems for controlling the temperature of electric heating appliances such as hot plates and ovens, by controlling the cumulative amount of time that current flows through the heating elements, and intermittently interrupting that current.

The invention also relates to on-off switch regulators of electric current, which act intermittently to open and close the circuit of currents heating electric appliances, the variations of the mean power delivered being produced by variation of the amount of time the current is on with reference to the amount of time the current is off.

Regulating apparatus of this type is already known, and is more particularly used for the control of electrical heating elements which comprise a thermostatic bi-metallic bi-laminar element which is heated by an auxiliary resistance, and the deformation of which bi-metallic element, under the control of a regulating member, provides for a variation of the relation between the amount of time on to the amount of time off, of the switch which opens and closes the electric current which is to be controlled.

In their practical application to the adjustment of the actual energy delivered to a heating element such as an electrical cooking hot plate, criticism has been made of devices of this type on the ground that they have caused too extensive disturbances of the commercial electrical supply circuits by reason of the frequent breaking and closing of the main supply of current of the devices. As a practical matter, it is necessary that the total amount of time, on and off, should not exceed one minute in the operation of reduced power, in order that the temperature of the hot plate should not undergo too great variations. In practice, in the case of baking ovens, it is desired to cause the power to vary only for smaller operations to a fraction of the maximum power, in general, to less than one-half.

The present invention, on this basis, has for its purpose to avoid the inconveniences which have been described.

An object of the present invention is to provide a device for regulating the electrical energy delivered to an electrical heating appliance having two principal heating elements which at certain times may be connected in parallel, and which comprises a displaceable assembly which is manually displaceable, according to the kind of operation desired, and has two push studs which respectively act on switch blades, and one of which can be displaced by a thermostatic bi-laminar element of the apparatus, and which bi-laminar element is heated by an auxiliary resistance element, the displaceable assembly being capable of assuming two extreme positions which respectively correspond to complete breaking of the current to open circuit, and the closing of the circuit to provide continuous full power of the current, without any adjustment of the two principal resistance heating elements, and between these two extreme positions the displaceable assembly is able to assume any desired intermediate position in a region representing the region of operation with regulation under control of the thermostatic bi-metallic bi-laminar element.

The present invention will be understood from the following description by reference to the accompanying drawings, wherein:

Fig. 1 is a schematic representation of an embodiment of a heating regulating circuit provided with a manually displaceable assembly according to the present invention, and which shows the positions of the parts during operation with thermostatic regulation;

Fig. 2 is a perspective view of the displaceable assembly with its control elements, adapted for operation according to the arrangement shown in Fig. 1;

Fig. 7 shows a detail of the mounting of the quick break switch contacts; and

Fig. 8 is a detail of adjusting means for adjusting the blade of Fig. 7.

Figure 5:
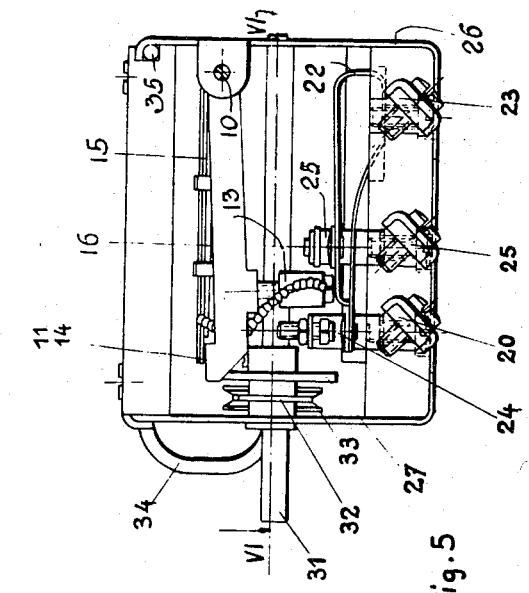
Fig. 5 is an interior view in elevation of the embodiment of Fig. 3, on the side of the push stud.
Figure 6:
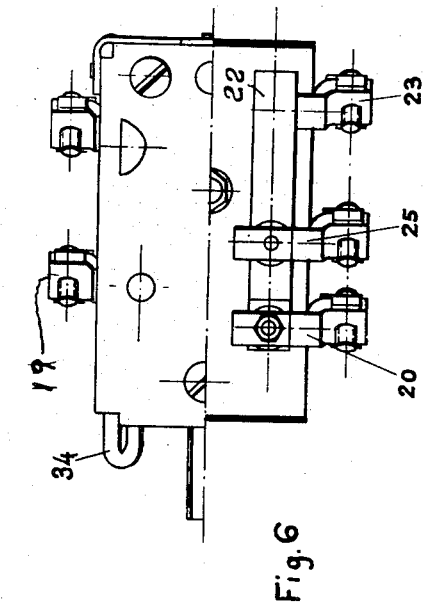
Fig. 6 is a view of the embodiment of Fig. 3, partly in plan and partly in section, taken on the line VI—VI of Fig. 5, the push stud being assumed to be raised.
Figure 3:
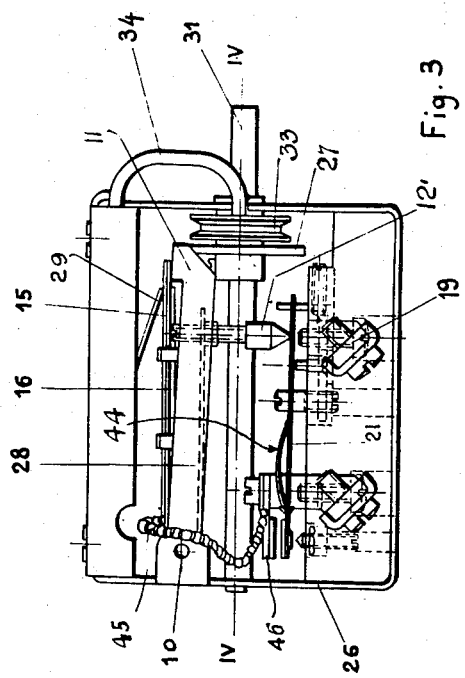
Fig. 3 is an inside view in elevation of an actual embodiment of a device such as is shown in Fig. 2, on the side of the push stud which is actuated by the bi-laminar element.
Figure 4:
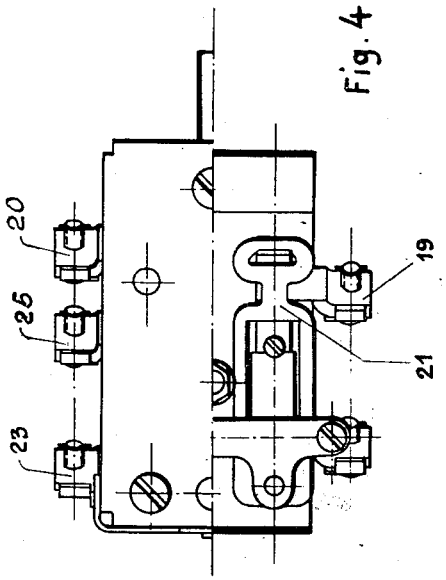
Fig. 4 is a view of the embodiment of Fig. 3, partly in plan and partly in section, taken on the line IV—IV of Fig. 3, the push stud being assumed to be raised.

The movement of the displaceable assembly of an apparatus according to the present invention, can be either a movement of translation, or a movement of rotation. In the following description of a particular embodiment, it will be assumed that the displaceable assembly has a movement only of rotation about a pivot.

In Fig. 1, the displaceable assembly has been shown in heavy lines. This assembly comprises an arm 11 which can tilt about a pivot 10 mounted on the base 26 of the apparatus. The displaceable assembly also comprises an element 14 which is formed rigidly and integrally attached at one of its ends 14b to an end of arm 11 and may extend substantially at right angles thereto or may extend otherwise. A thermostatic bi-metallic bi-laminar element 15 may be rigidly attached at one end to the other end 14c of element 14, and may extend at right angles thereto. An auxiliary heating resistance element 16 is in heat exchange relation with bi-laminar element 15. The arm 11 and the element 14 are preferably of metal. The two push studs 12 and 13, whose bodies are preferably made of insulating material, but whose conical tips are of metal, are positioned near the opposite ends of the element 14. The push stud 12 is carried at the free end 15a of bi-laminar element 15. The resistance element 16 may be connected across the supply terminals in the manner shown. The element 14 has a bridge portion 14a through which the metal spring blade 21a freely passes and which is pivoted at post 21b and which carries contact 21, which is normally urged to engage fixed contact 46. The heating element is constituted of the two heating resistances 17 and 18. All of the elements which have been described are assumed to be within an enclosed space (not shown) which is to be maintained at a desired temperature. The input terminals to which the supply current is applied are designated by 19 and 20. The resistance 17 is employed alone for operation with heat regulation by thermostatic bi-laminar element 15. During straight operation at continuous full load without regulation, the two resistances 17 and 18 are connected in parallel across the input terminals 19 and 20.

The push stud 12 can open the switch contact 21 when the thermostatic bi-laminar element 15 becomes deformed due to being heated by auxiliary resistance 16. The switch contact 21 has a quick break characteristic, but closes again as soon as the push stud 12 ceases its pushing action. The switch contact 21 is mounted on the flexible blade 21a which is supported by the post 21b to which input connection wire 19 is connected.

The push stud 13 of Fig. 1 may be pushed against a flexible conducting metal blade 22 which is of a special U shape design. This blade 22 is fixed to and pivots about the terminal 23, and carries two separate switch contacts 24 and 25. The push stud 13 carries at its end a contact piece 13' which makes contact with the blade 22, and this forms a current interrupter for the auxiliary resistance 16. Contact 25 carried by displaceable blade 22 may engage fixed contact 25b carried by a plate 25a which is fixedly mounted on a terminal post 25c to which one end of resistance 18 is connected. The other end of resistance 18 is connected to a post 18a. Resistance 17 is connected between post 18a and another post 17a.

In the position shown in Fig. 1 (which it normally assumes if not urged therefrom), the apparatus is assumed to be in operating position using only the single heating resistance 17, and operating under thermostatic regulation. The switch contact 24 is closed against fixed contact 48, and the contact 25 is open from fixed contact 25b, while the contact 21 intermittently opens and closes from fixed contact 46 under the action of the bi-laminar element 15. If the arm 11 becomes sufficiently displaced toward the right about the pivot 10, which may be done manually on bridge portion 14a, or applying pressure to any other portion of assembly 11, 14, as by a cam, the contacts 24 and 21 become permanently opened, and the contact 24 completely interrupts the passage of the current. If, on the contrary, the arm 11 becomes sufficiently displaced toward the left, which may be done manually, the switch contact 25 closes, the push stud 13 retracts its contact 13' from the blade 22, which interrupts the current in the auxiliary resistance 16, and continuous operation at full load without regulation occurs, the heating resistance elements 17 and 18 being shunted in parallel across input terminals 19 and 20. The circuit through auxiliary resistance 16 may be traced from terminal 20 through contact 24, blade 22, contact 13', contacts 46 and 21, blade 21a, to terminal 19.

The operation of the apparatus for different conditions the deformations of the bi-laminar element 15 due to the influence of the ambient temperature. The push stud 12 may be mounted on auxiliary bi-laminar element 28. However, the bi-laminar element 15 is held against, and to that extent, made rigid with the displacement of the frame 11, 14, by an orienting spring blade 29 (Fig. 2) which causes bi-laminar element 15 to be applied against the raised edge of the frame 11, 14. The spring blade 29 is fixed, at 30, to the base 26 of the apparatus.

The cam 27 for adjusting the position of the frame 11, 14 is mounted on the control shaft 31 of the apparatus, together with a second setting or locking cam 32 which is for marking the position. This second marking cam 32 cooperates with a grooved roller 33 which constantly is urged against it, due to a torsion spring 34 which is fixedly mounted at its free end 35 on the base 26. To improve the clarity of the drawing, it has been shown in Fig. 2, contrary to the true fact, that the cam 32 and the roller 33 are spaced apart. The marking cam 32 is spaced conveniently with reference to the adjusting cam 27. A square knob 47 on the end of shaft 31 provides for manually setting the shaft 31 in any desired orientation.

The profile of the setting cam 32 for marking the position is such that, in combination with cam 27, it can fulfill its intended role, that is, that one of the peripheral parts *ab* or *bc* (Fig. 2) can come to engage the groove of the roller 33 without any possibility of its assuming an intermediate position, while along the peripheral length of the part *cda* of the profile (Fig. 2), the cam 32 can rest and be held with any point of this part *cda* engaging the roller 33.

The peripheral parts *ab* and *bc* of marking cam 32 (Fig. 2) correspond respectively to open circuit and to continuous full load operation, while the peripheral part *cda* constitutes the region of thermostatic regulation.

According to the position which the user may set, with reference to the roller 33, the cam 32 for marking position along the length of the profile part *cda*, by manually rotating shaft 31 to the desired setting, he can adjust the relative duration of the period of passage of current, and of interruption of the current by the bi-laminar element 15, and hence he can adjust the temperature of a hot plate or an oven or enclosure heated by resistance 17, thermostatic regulation thereof by the effect of thermal deformations of said bi-laminar element, means including a cam member with a plurality of arched portions and provided with markings indicative of the setting thereof during use and a roller cooperating with said cam member in three positions for displacing said assembly into three positions corresponding to three distinct operating conditions, namely, a first one of said three positions corresponding to the open circuit condition of said apparatus with said roller engaging a first small arched portion of said cam member, a second position corresponding to continuous full load operation of said apparatus with said roller engaging a second small arched portion of said cam member following said first portion, and a third variable position corresponding to the operation of said apparatus under regulation thereof with said roller tangentially engaging a large arched portion of said cam member at any point thereof thereby providing a variable setting for said control system while operating said apparatus under thermostatic regulation, and spring means cooperating with said roller to provide a snap action when passing from one position to another.

2. The combination according to claim 1, wherein said displacing means includes a second cam member in direct contact with said assembly.

3. The combination according to claim 1, wherein said roller is round and provided with a groove, said first and second small arched portions being of concave configuration, and said large third portion being of convex configuration, the edge of said cam member moving in said groove.

4. The combination according to claim 2, further comprising a shaft with a first axis on which both said cam members are mounted, said displaceable assembly being oscillatable about a second axis perpendicular to the axis of said first shaft.

5. The combination according to claim 1, wherein said interrupter is of the quick-braking type including an arched actuating spring provided with means for adjusting the tension thereof.

6. The combination according to claim 1, wherein said displaceable assembly comprises a second push stud and a second single-pole interrupter formed by a conducting blade for interrupting the input current, said second push stud being displaced against said second interrupter, a terminal connected with one of said heating elements, said blade pivoting about said terminal in such a manner that in the open circuit position the two interrupters of input current are mechanically opened by the two push studs displaced by said displaceable assembly.

7. The combination according to claim 6, further comprising a heating resistance for said bi-laminar element, and in which said second push stud carries a contact member to provide a current input circuit to said heating resistance, said last-mentioned connection being opened by movement of said contact member out of contact with said blade in the full load position, said blade including a further contact member for simultaneously electrically interconnecting by the elasticity thereof and by said further contact member the other of said heating elements into the heating circuit.

8. The combination according to claim 1, wherein said displaceable assembly forms an oscillating frame together with said blade but independently thereof about an axis along one of its sides, further comprising a spring means to provide common displacement of said frame and said blade.

9. The combination according to claim 1, wherein said bi-laminar element is formed of two bi-laminar members, one of said members compensating the effect of ambient temperature on the regulating functioning of the other member.

References Cited in the file of this patent

UNITED STATES PATENTS

| | | |
|---|---|---|
| 1,885,053 | Slough | Oct. 25, 1932 |
| 2,302,603 | Davis et al. | Nov. 17, 1942 |
| 2,399,423 | Bletz | Apr. 30, 1946 |
| 2,434,467 | McCormick | Jan. 13, 1948 |
| 2,487,037 | Smith | Nov. 1, 1949 |
| 2,592,989 | Wilson | Apr. 15, 1952 |
| 2,648,755 | Vogelsberg | Aug. 11, 1953 |